F. W. KELLUM.
STOCK FEEDER.
APPLICATION FILED FEB. 25, 1910.
961,779.
Patented June 21, 1910.
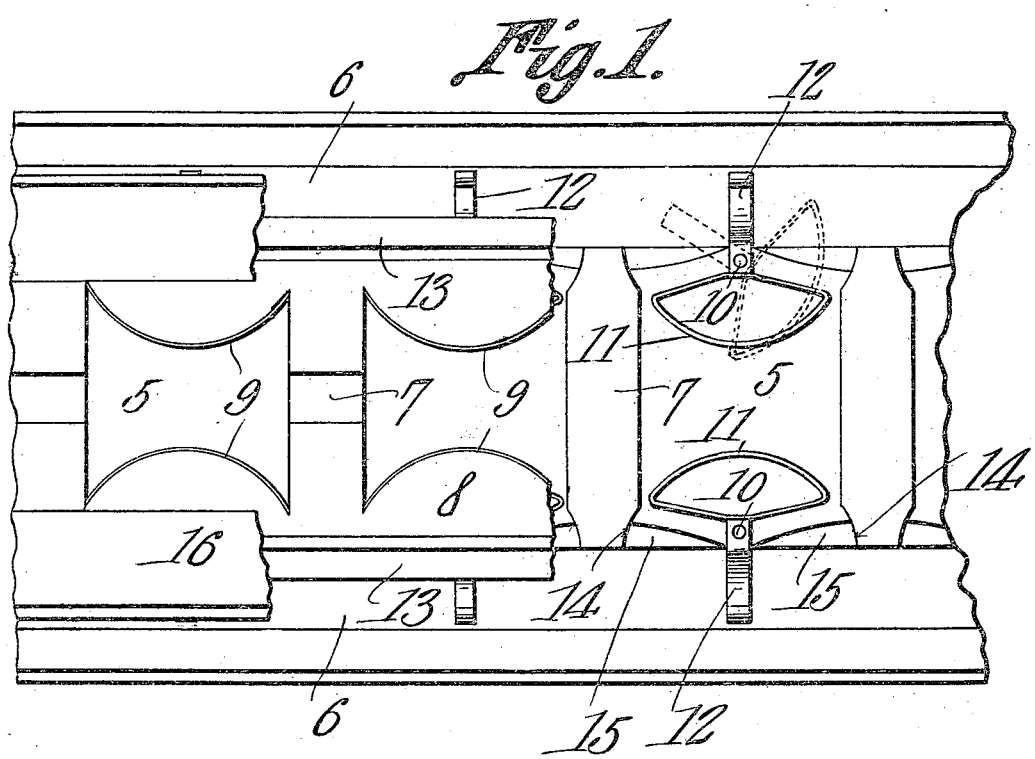
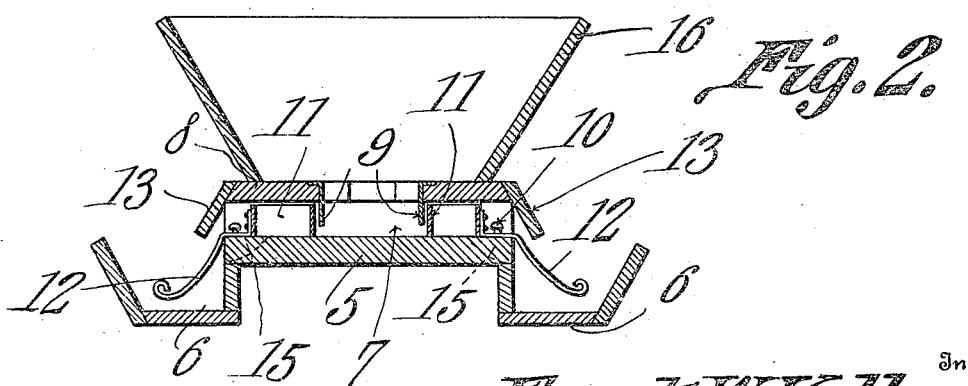

UNITED STATES PATENT OFFICE.

FRANK W. KELLUM, OF PEABODY, KANSAS.

STOCK-FEEDER.

961,779.

Specification of Letters Patent. Patented June 21, 1910.

Application filed February 25, 1910. Serial No. 545,879.

*To all whom it may concern:*

Be it known that I, FRANK W. KELLUM, a citizen of the United States, residing at Peabody, in the county of Marion and State of Kansas, have invented a new and useful Stock-Feeder, of which the following is a specification.

This invention relates to improvements in devices for supplying feed to stock in limited quantities, in order to prevent waste, the device being more especially designed for feeding hogs.

It is the object of the invention to provide a device of the kind stated which is simple in construction, and economical in operation, a valve being provided which is operated by the animal to let out a small quantity of feed, thus effectually preventing waste thereof.

The invention also has for its object to provide a feeding device embodying certain novel structural details to be hereinafter described and claimed.

With these objects in view, the invention consists in a novel construction and arrangement of parts to be hereinafter described and claimed, reference being had to the accompanying drawing, in which—

Figure 1 is a plan view of the feeder partly broken away, and Fig. 2 is a transverse section thereof.

Referring more particularly to the drawing, 5 denotes a platform, mounted between a pair of troughs 6 from which the animals feed, said troughs being arranged along the opposite longitudinal edges of the platform. On the platform, at regular intervals, are mounted cross strips 7, on top of which are mounted boards 8 extending in the direction of the length of the platform 5, the inner edges of said boards being spaced from each other, and their outer edges extending along the outer longitudinal edges of the platform. The cross strips 7 space the boards 8 from the top of the platform 5. The inner edges of the boards, between the cross strips, are curved, and these curved edges are lined with a metal strip 9 forming aprons which extend below the bottom of the boards, and are spaced a short distance from the top of the platform 5.

Pivotally mounted on top of the platform 5 between said platform and the boards 8, as indicated at 10, are valves 11 for controlling the dropping of the feed into the troughs 6. Two of these valves are located in each of the spaces between the cross strips 7, one member of said pair of valves being located adjacent to one edge of the platform 5 so as to discharge into the trough 6 adjacent to the said edge, and the other member of said pair of valves being located adjacent to the opposite edge of the platform so as to discharge into the trough adjacent to that edge of the platform. The valves are segmental shaped, and work behind those portions of the aprons 9 extending below the boards 8, the valves extending close to said aprons. To the valves are secured operating stems 12, which extend into the trough, which is for a purpose to be presently described. The valves operate in a horizontal plane.

To the outer edges of the boards 8 are secured guard strips 13 which extend downwardly across the outer ends of the spaces between the said boards and the platform 5. The ends of the cross strips 7 are beveled off as indicated at 14 so as not to interfere with the swinging movement of the valves, and the outer edges of the platform, between the cross strips are beveled off as indicated at 15 to facilitate the dropping of the feed into the troughs.

The feed is contained in a hopper 16 mounted on top of the boards 8, the hopper being so positioned as to discharge into the space between the boards 8.

In operation, the grain or other feed works from the hopper under the aprons 9, so that when the valves 11 are swung back and forth, the feed is pushed forwardly into the troughs, the operation of the valves being effected by the rooting animal coming in contact with the valve stem 12. The feed is thus thrown into the troughs in small quantities, and waste is effectually prevented. The strips 7 form a series of compartments, in each end of which a pair of valves is located, so that each of said compartments supplies two animals.

Fig. 1 shows only a fragment of the device three compartments being illustrated, but it will be understood that the device may be made in any size, and with any number of compartments according to the number of animals it is desired to feed at one time.

What is claimed is:

1. In a stock feeder, a feed holding compartment, a trough arranged below one end of the compartment, and a horizontally operating valve working in the compartment adjacent to said end, said valve having an operating stem projecting into the trough.

2. A stock feeder comprising a feed holding compartment, a trough arranged below one end of the compartment, a valve working in the compartment adjacent to said end, said valve having an operating stem extending into the trough, a feed hopper mounted above the compartment, and an apron extending across the compartment and spaced from the floor thereof, the aforesaid valve working behind the apron.

3. A stock feeder comprising a platform, troughs arranged along opposite edges of the platform, cross strips on the platform, longitudinal strips mounted on the cross strips, said cross strips and longitudinal strips forming a series of feed holding compartments on the platform, valves working in the compartments, one of said valves being located in each end thereof, and operating stems on the valves extending into the troughs.

4. A stock feeder comprising a platform, troughs mounted on opposite sides thereof, cross strips on the platform, longitudinal strips mounted on the cross strips, the inner edges of said longitudinal strips being spaced apart, aprons extending from said longitudinal strips in the direction of the platform, and spaced from the top thereof, said aprons being located between the cross strips, horizontally operating valves mounted on the platform between the cross strips, and behind the aprons, and operating stems on said valves extending into the troughs.

5. A stock feeder comprising a platform, troughs mounted on opposite sides thereof, cross strips mounted on the platform, longitudinal strips mounted on the cross strips, the inner edges of the longitudinal strips being spaced from each other, and said edges between the cross strips being curved, aprons depending from said curved edges of the longitudinal strips, and spaced at their lower ends from the platform, segmental horizontally operating valves mounted on the platform between the cross strips, and working behind the aprons, and operating stems projecting from the valves into the troughs.

In testimony that I claim the foregoing as my own, I have hereto affixed my signature in the presence of two witnesses.

FRANK W. KELLUM.

Witnesses:
W. E. MOUSER,
J. LOUIS.